US012036154B2

(12) United States Patent
Morgan

(10) Patent No.: US 12,036,154 B2
(45) Date of Patent: Jul. 16, 2024

(54) SYSTEMS AND METHODS FOR A SURGICAL POSITIONING EXOSKELETON SYSTEM

(71) Applicant: Dignity Health, San Francisco, CA (US)

(72) Inventor: Clinton D. Morgan, San Francisco, CA (US)

(73) Assignee: Dignity Health, San Francisco, CA (US)

( * ) Notice: Subject to any disclaimer, the term of this patent is extended or adjusted under 35 U.S.C. 154(b) by 139 days.

(21) Appl. No.: 17/759,447

(22) PCT Filed: Feb. 4, 2021

(86) PCT No.: PCT/US2021/016580
§ 371 (c)(1),
(2) Date: Jul. 26, 2022

(87) PCT Pub. No.: WO2021/158769
PCT Pub. Date: Aug. 12, 2021

(65) Prior Publication Data

US 2023/0066826 A1 Mar. 2, 2023

Related U.S. Application Data

(60) Provisional application No. 63/118,524, filed on Nov. 25, 2020, provisional application No. 63/066,106, filed on Aug. 14, 2020, provisional application No. 62/969,712, filed on Feb. 4, 2020.

(51) Int. Cl.
*A61G 13/00* (2006.01)
*A61G 13/06* (2006.01)
*A61G 13/12* (2006.01)

(52) U.S. Cl.
CPC .......... *A61G 13/0054* (2016.11); *A61G 13/06* (2013.01); *A61G 13/122* (2013.01); *A61G 13/1225* (2013.01); *A61G 13/123* (2013.01); *A61G 13/1235* (2013.01); *A61G 2200/32* (2013.01)

(58) Field of Classification Search
None
See application file for complete search history.

(56) References Cited

U.S. PATENT DOCUMENTS 546,421 A 9/1895 Duke
5,354,282 A 10/1994 Bierman
5,545,180 A 8/1996 Le et al.
(Continued)

FOREIGN PATENT DOCUMENTS

CN 205215904 U 5/2016
CN 205215909 U 5/2016

OTHER PUBLICATIONS

Patent Cooperation Treaty, International Search Report and Written Opinion, International Applicatio No. PCT/US2021/016580, dated Apr. 29, 2021, 9 pages.
(Continued)

*Primary Examiner* — Adam C Ortiz
(74) *Attorney, Agent, or Firm* — Polsinelli PC

(57) ABSTRACT

Various embodiments of a system and associated method for a surgical positioning apparatus for supporting a patient in supine, lateral, kidney and prone position are disclosed herein.

19 Claims, 15 Drawing Sheets

(56) References Cited

U.S. PATENT DOCUMENTS

| | | | | |
|---|---|---|---|---|
| 5,618,314 | A | 4/1997 | Harwin et al. | |
| 5,927,277 | A | 7/1999 | Baudino et al. | |
| 6,076,525 | A | 6/2000 | Hoffman | |
| 6,994,717 | B2 | 2/2006 | Konya et al. | |
| 7,152,261 | B2 * | 12/2006 | Jackson | A61G 13/0036 5/624 |
| 8,079,365 | B2 | 12/2011 | Block et al. | |
| 8,157,919 | B2 | 4/2012 | Vazales et al. | |
| 8,745,787 | B1 | 6/2014 | Heimlich | |
| 9,445,714 | B2 | 9/2016 | Vazales et al. | |
| 2005/0165429 | A1 | 7/2005 | Douglas et al. | |
| 2007/0167980 | A1 | 7/2007 | Figulla et al. | |
| 2012/0016425 | A1 | 1/2012 | Shaffrey et al. | |
| 2016/0361218 | A1 | 12/2016 | Dubois et al. | |
| 2017/0112699 | A1 * | 4/2017 | Hight | A61G 13/1245 |
| 2019/0046381 | A1 * | 2/2019 | Lim | A61G 7/015 |
| 2019/0262204 | A1 | 8/2019 | Hertz et al. | |

OTHER PUBLICATIONS

Weitlaner Retractor, Surgical instruments, downloaded Dec. 12, 2018, 1 page.

D'Errico-Adson Retractor, BD V. Mueller Catalog, downloaded Dec. 12, 2018, 1 page.

TeDan Surgical Innovations, Transverse Retractor, downloaded Dec. 12, 2018, 3 pages.

Gelpi Retractor 3.5, Premium Instruments, downloaded Jul. 26, 2022, 2 pages.

Flexible Helping Hands Soldering Iron, downloaded Dec. 12, 2018, 2 pages.

* cited by examiner

SYSTEMS AND METHODS FOR A SURGICAL POSITIONING EXOSKELETON SYSTEM

CROSS REFERENCE TO RELATED APPLICATIONS

The present document is a PCT patent application that claims benefit to U.S. Provisional Patent Application Ser. No. 62/969,712 filed 4 Feb. 2020, U.S. Provisional Patent Appln. 63/066,106 filed 14 Aug. 2020 and U.S. Provisional Patent Appln. 63/118,524 filed 25 Nov. 2020, which are herein incorporated by reference in their entireties.

FIELD

The present disclosure generally relates to surgical apparatuses, and in particular, to a surgical exoskeleton positioning system for 360° circumferential access surgery.

BACKGROUND

Positioning of a patient during surgeries, especially in multi-stage 360° surgery (thoracic surgery, abdominal surgery, spine surgery, etc.) sometimes requires the patient to be re-positioned between each stage in order to enable access to various structures within the body. In particular, during some surgeries, it is necessary to transition the patient between prone position where the patient lies on their stomach, lateral position where the patient lies on their side, and supine position where the patient lies on their back. To transition the patient between positions during surgery, the patient needs to be prepped and re-positioned between each position. Further, some current technologies, such as the Jackson table, allow transitioning a patient between prone and supine positions but often require a surgical team to "sandwich" a patient on a surgical frame and rotate the surgical frame such that the patient is transitioned between prone and supine positions, a process which can be time-consuming, cumbersome and/or risky. In addition, these technologies often do not allow for lateral positioning of the patient during surgery or may require additional support structures for positioning patients.

Historically, surgical tables have been used to artificially bring a patient into lordosis or kyphosis, depending on which bodily structures need to be accessed, however this often requires placing pads, foam support structures, or other devices on a flattened table such as the Jackson table to "prop" the patient into the desired position. This can be imprecise in nature, which can be both time-consuming and unconducive to increasingly common robotic-assisted surgery which often requires more precise positioning.

It is with these observations in mind, among others, that various aspects of the present disclosure were conceived and developed.

BRIEF DESCRIPTION OF THE DRAWINGS

Corresponding reference characters indicate corresponding elements among the view of the drawings. The headings used in the figures do not limit the scope of the claims.

DETAILED DESCRIPTION

Figure 1:
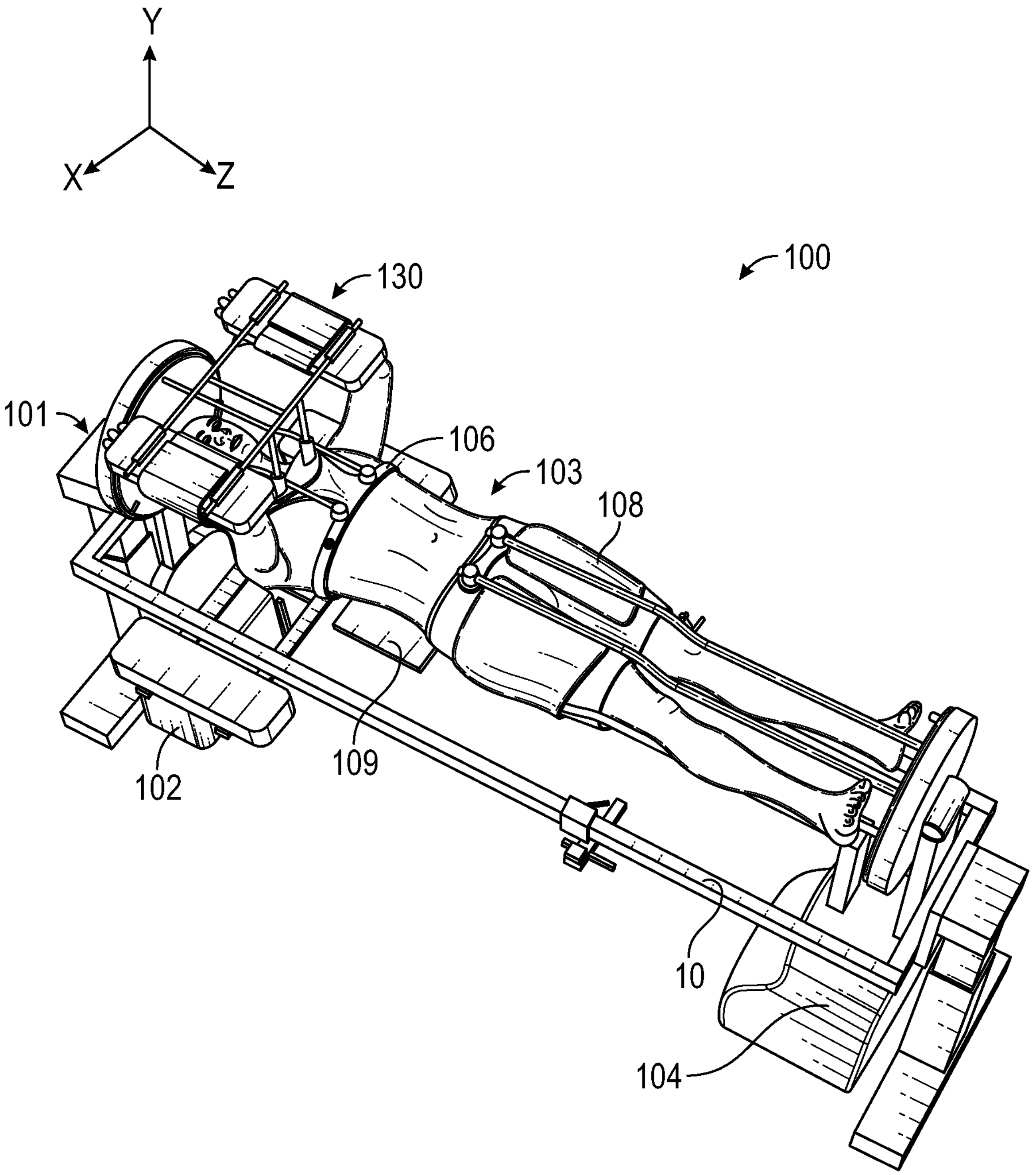
FIG. 1 is an illustration showing a perspective view of a surgical positioning apparatus with a patient positioned in a supine position.
Figure 2A:
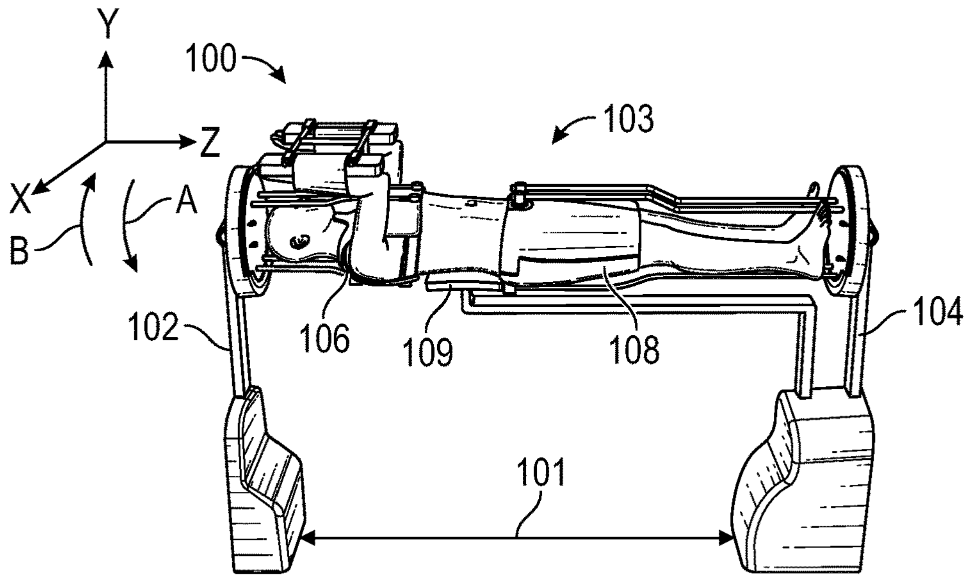
FIGS. 2A-2F are a series of illustrations showing the surgical positioning apparatus of FIG. 1 transitioning a patient between supine, lateral, kidney and prone positions.
Figure 2B:
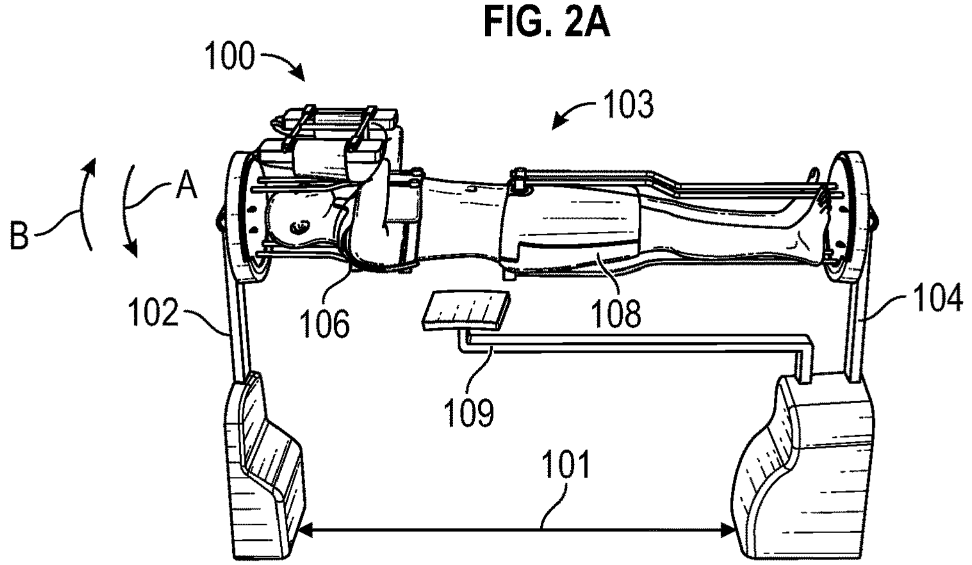
Figure 2C:
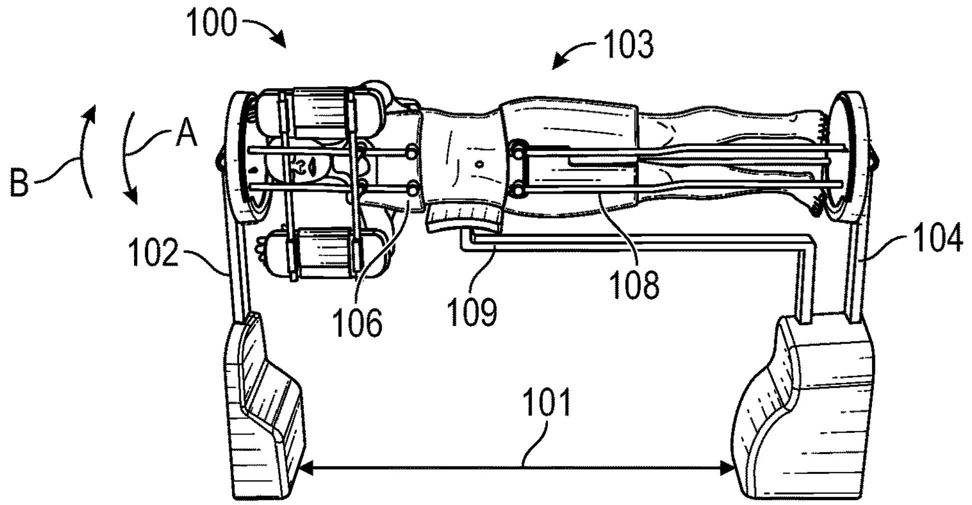
Figure 2D:
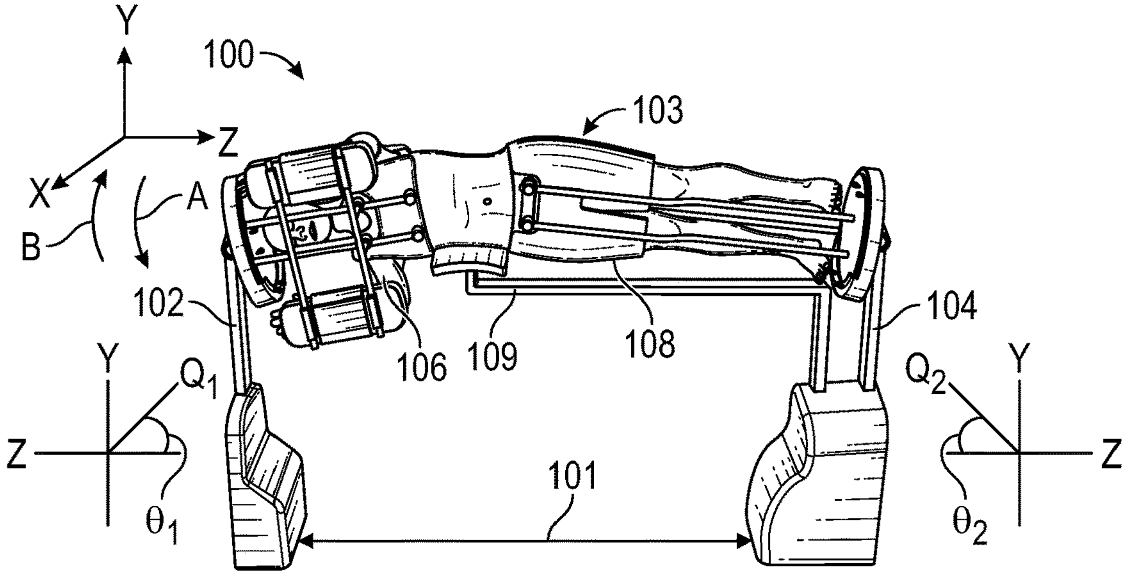
Figure 2E:
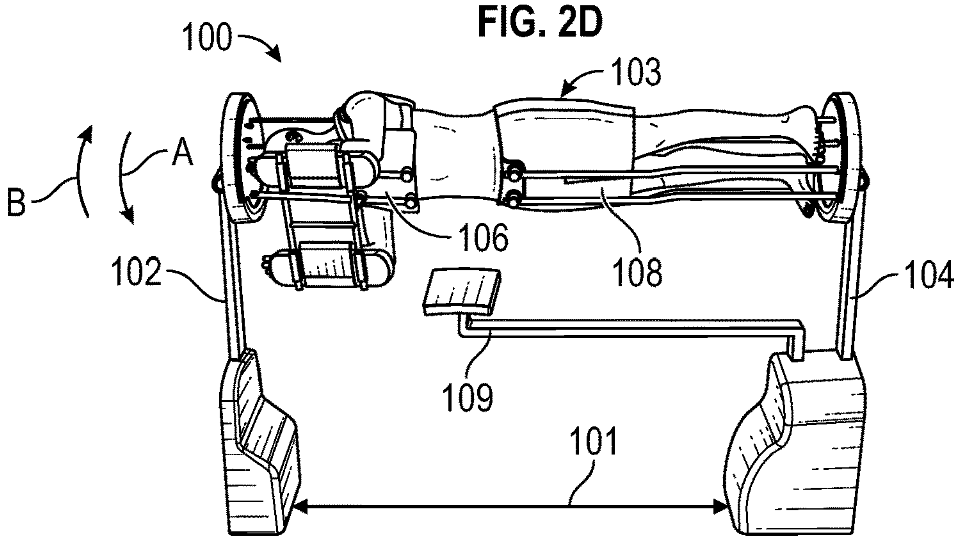
Figure 2F:
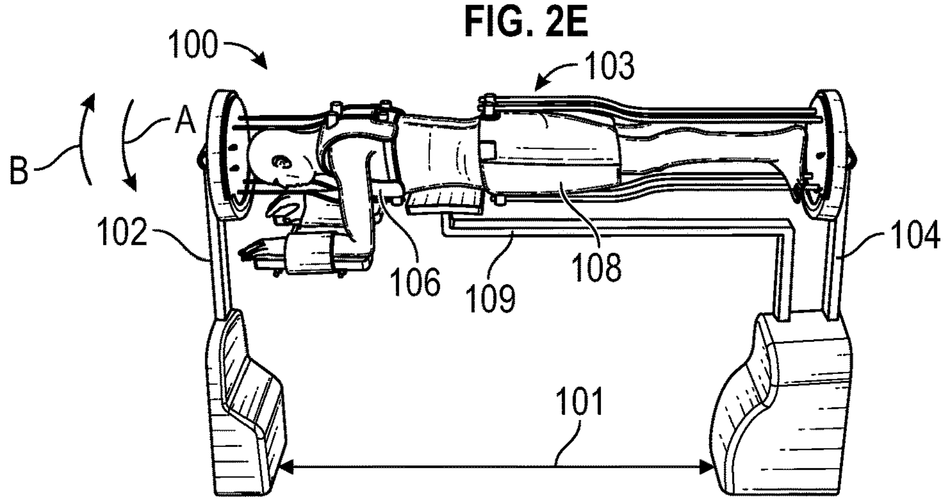

Various embodiments of a system and associated method for a surgical positioning apparatus are described herein. The surgical positioning apparatus includes a support frame and a rotatably mounted exoskeleton associated with the support frame for supporting a patient in various positions such as prone, lateral, lateral oblique, kidney, supine, or jackknife positions and allowing transition between these positions without requiring extensive re-prepping for multi-stage spinal surgery. The support frame is operable to adjust a height of the exoskeleton along a vertical axis Y, as well as operable to rotate the exoskeleton about a horizontal axis Z such that the patient can be positioned in prone, lateral or supine positions. The support frame further provides a capability of increasing or decreasing an angle of the exoskeleton relative to the support frame along a vertical axis Y to orient the patient in a kidney or jackknife position such that an apex is formed at the spine of the patient to allow better access to spinal structures.

In some embodiments, the exoskeleton includes an upper body exoskeleton associated with an upper body frame of the support frame and a lower body exoskeleton associated with a lower body frame of the support frame with the first and second support frames being operable for independent positioning with respect to one another. The upper body exoskeleton and lower body exoskeleton secure a patient within the surgical positioning system and apply support to areas of the patient's body where a majority of mass is centered, while allowing 360° access to the abdomen, lower thoracic spine and lumbar spine for surgery. In one method of turning a patient from one position to another, the exoskeleton is lifted, rotated about horizontal axis Z in a clockwise or counterclockwise direction A or B, and then lowered back to a working position. The rotation may be manual or motorized and may include various locking points such that the patient can be rotated and secured in a plurality of surgical positions.

In one aspect, the surgical positioning apparatus is used as a basis for stereotaxy by allowing a practitioner to identify reference points on the body relative to the surgical positioning apparatus and plan operations accordingly. Given the positional variability of the surgical positioning apparatus, a position of the body can be more precisely manipulated by allowing measurable adjustment of angles, heights, and rotational positions of both the upper body exoskeleton and the lower body exoskeleton. Referring to the drawings, embodiments of a surgical positioning apparatus are illustrated and generally indicated as 100 in FIGS. 1-12.

Referring to FIG. 1, the surgical positioning apparatus 100 is shown defining a support frame 101 and an exoskeleton 103 rotatably mounted on the support frame 101. As illustrated, the exoskeleton 103 defines an upper body exoskeleton 106 configured to receive and secure an upper body of a patient to the support frame 101 and a lower body exoskeleton 108 configured to receive and secure a lower body of the patient to the support frame 101. The support frame 101 includes an upper body frame 102 operatively associated with the upper body exoskeleton 106 and a lower body frame 104 operatively associated with the lower body exoskeleton 108. In some embodiments, the lower body frame 104 is associated with an abdominal support 109 for supporting and restraining an abdomen of the patient. As shown, the upper body exoskeleton 106 is associated with an armrest portion 130 for supporting the patient's arms during positioning and surgery. As illustrated in FIG. 1, surgical positioning system 100 can be used with an existing surgical table 10, such as the Jackson table.

Figure 7:
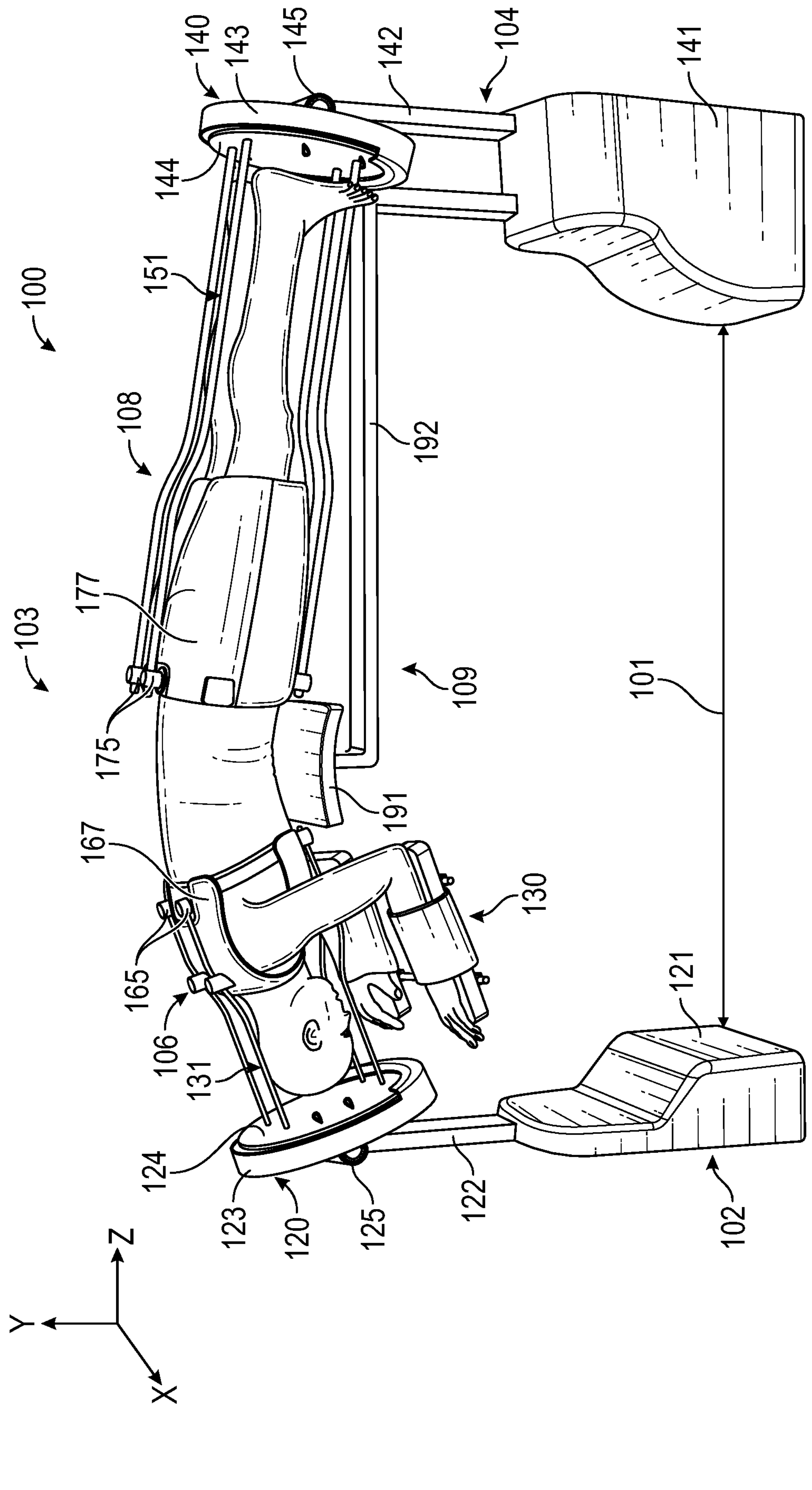
FIG. 7 is an illustration showing a side view of the surgical positioning apparatus of FIG. 1 with the patient positioned in a "jackknife" position.
Figure 11:
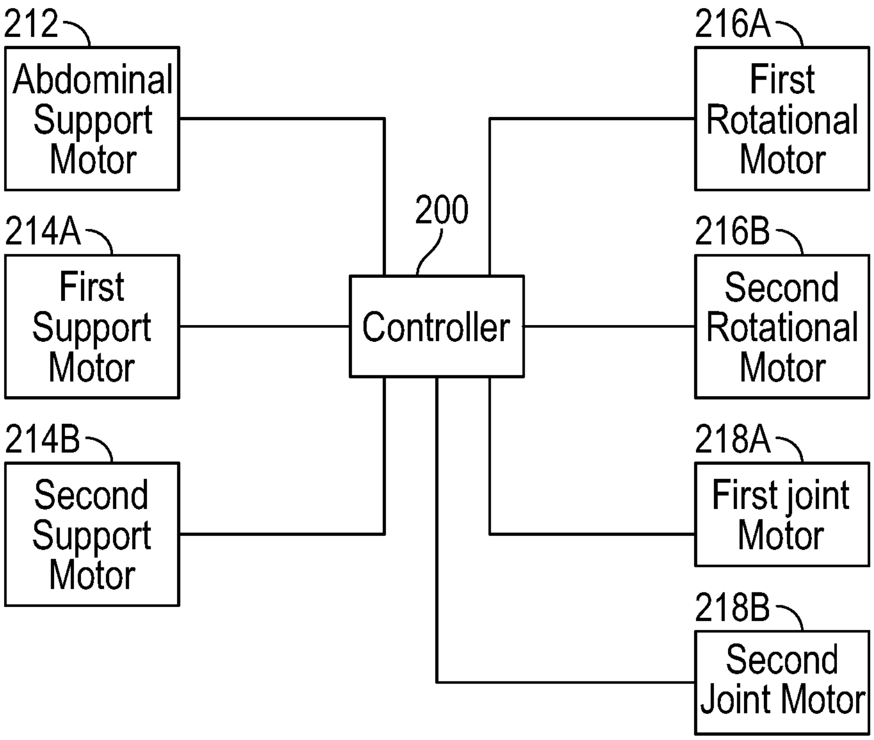
FIG. 11 is an illustration showing a communication between the controller and a plurality of motors for actuating aspects of the surgical positioning apparatus of FIG. 1.

As discussed above and as shown in FIGS. 2A-2F, the exoskeleton 103 of surgical positioning apparatus 100 is rotatably mounted on the support frame 101 and can be rotated in a clockwise or counterclockwise direction A or B about a horizontal axis Z such that the patient assumes a supine position (FIGS. 2A and 2B), a lateral position (FIG. 2C), a kidney position (FIG. 2D), a lateral oblique position (FIG. 2E) and a prone position (FIG. 2F). As shown, the upper body frame 102 and lower body frame 104 of the support frame 101 can be heightened or shortened such that the exoskeleton 103 is lifted or lowered relative to the ground based on the needs of the patient and surgical team. The support frame 101 is also operable for increasing or decreasing an angle $\theta_1$ of the upper body exoskeleton 106 and $\theta_2$ of the lower body exoskeleton 108 relative to the vertical axis Y to orient the patient into a kidney position (FIG. 2D) or a jackknife position (FIG. 7). In one aspect, the upper body exoskeleton 106 and the lower body exoskeleton 108 are each operable for being positioned independently of one another. Further, the abdominal support 109 may be lifted or lowered relative to the ground such that the abdominal support 109 can be positioned as needed, as specifically shown in FIGS. 2A-2C. In some embodiments, the abdominal support 109 is lifted or lowered relative to the ground by an abdominal support motor 212 (FIG. 11) in operative communication with a controller 200 (FIG. 11).

Figure 3:
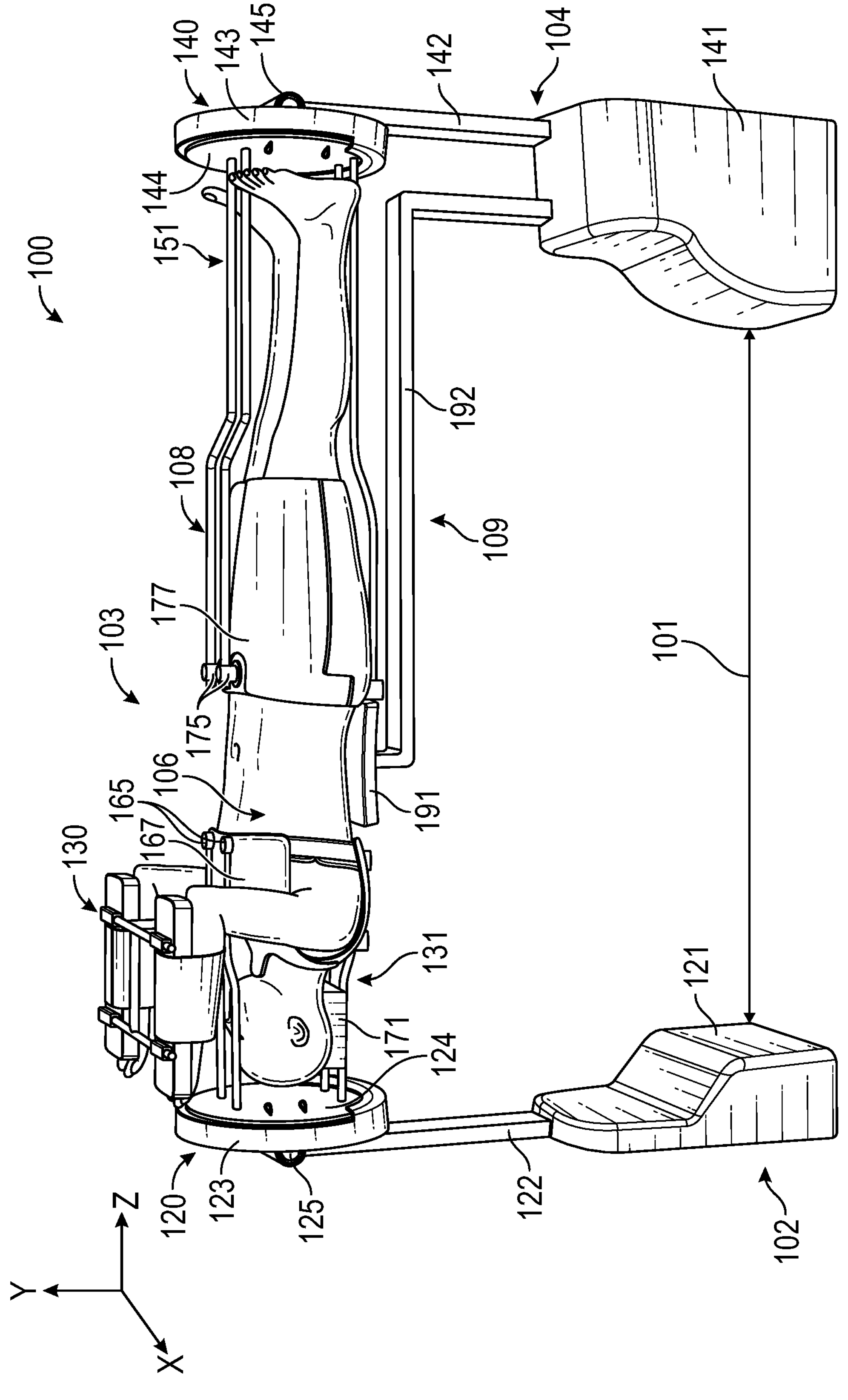
FIG. 3 is an illustration showing a side view of the surgical positioning apparatus of FIG. 1 with the patient positioned in the supine position.
Figure 4:
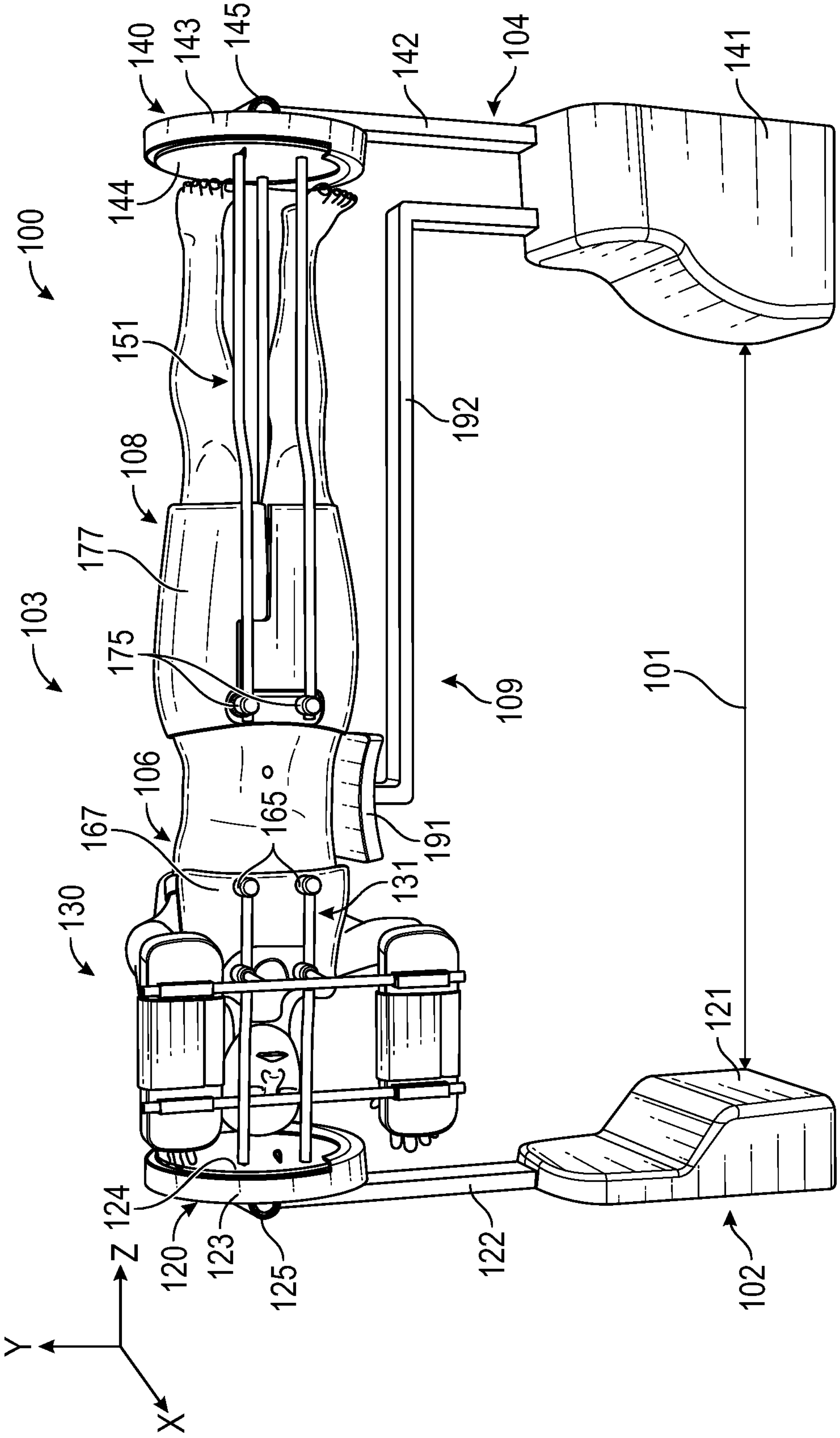
FIG. 4 is an illustration showing a side view of the surgical positioning apparatus of FIG. 1 with the patient positioned in a lateral position.
Figure 5:
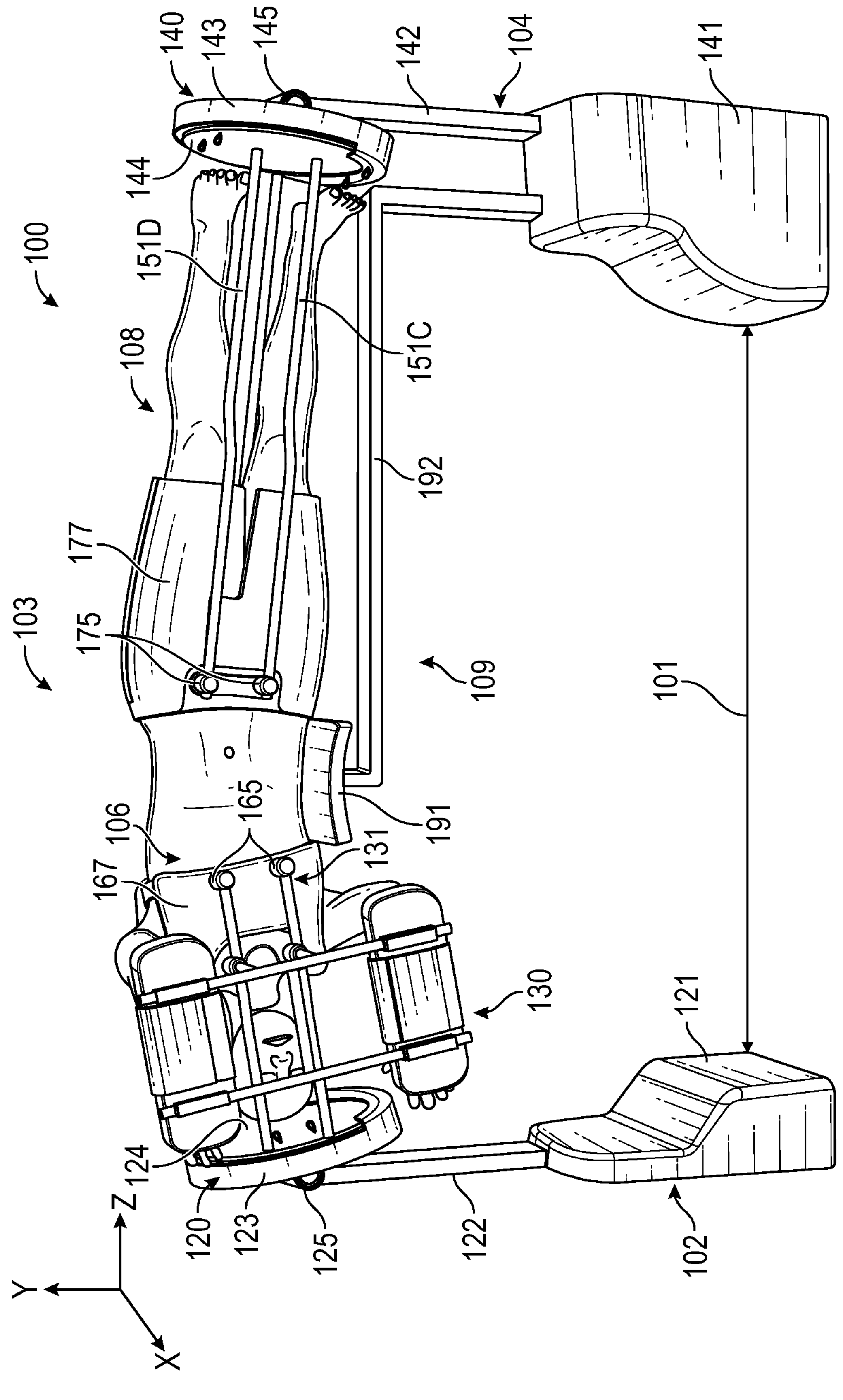
FIG. 5 is an illustration showing a side view of the surgical positioning apparatus of FIG. 1 with the patient positioned in a kidney position.
Figure 6:
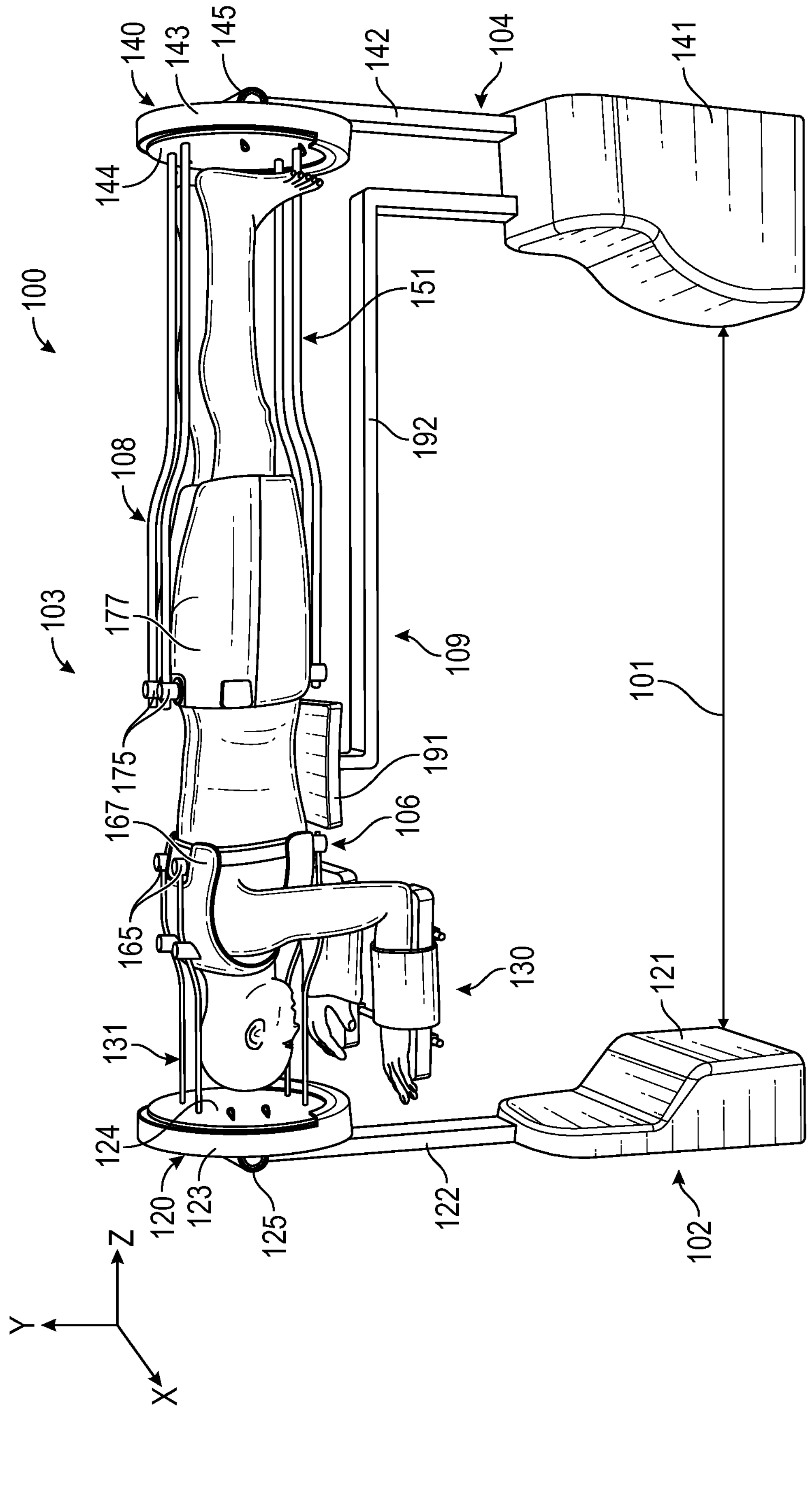
FIG. 6 is an illustration showing a side view of the surgical positioning apparatus of FIG. 1 with the patient positioned in a prone position.

Referring to FIG. 3, the support frame 101 of surgical positioning apparatus 100 includes the upper body frame 102 defined at a "head-end" of the patient and the lower body frame 104 defined at a "foot-end" of the patient, respectively providing support to upper body exoskeleton 106 and lower body exoskeleton 108. In some embodiments, the upper body frame 102 of the support frame 101 includes a base portion 121 and a support member 122 extending upward to align with vertical axis Y. As shown, the upper body frame 102 further includes a first rotary assembly 120 including a face 124, upper body frame 102 configured for engagement and rotation of the upper body exoskeleton 106 about an axis $Q_1$ (FIG. 2D) defined along a direction of elongation of the upper body exoskeleton 106 to form rotational angle $\phi_1$. Referring to FIG. 9D, the first rotary assembly 120 includes a rotational indicator 128 showing an angle of rotation $\phi_1$ of the upper body exoskeleton 104 about the horizontal axis Z. In some embodiments, the first rotary assembly 120 is engaged with an upper end of the support member 122 by a joint 125 operable for increasing, decreasing, and/or maintaining an angle $\theta_1$ (FIG. 9C) of the upper body exoskeleton 106 relative to the vertical axis Y. As shown, in some embodiments, the joint 125 includes an angle indicator 127 showing the angle $\theta_1$ held between the vertical axis Y and the direction of elongation of the upper body exoskeleton 106.

Similarly, in some embodiments, the lower body frame 104 of the support frame 101 includes a base portion 141 and a support member 142 extending upward in a vertical direction Y. As shown, the lower body frame 104 further includes a second rotary assembly 140 including a face 144, lower body frame 104 configured for engagement and rotation of the lower body exoskeleton 108 to form rotational angle $\phi_2$. Similarly, as shown in FIG. 9D, the second rotary assembly 140 includes a rotational indicator 148 showing angle of rotation $\phi_2$ of the lower body exoskeleton 108 about an axis $Q_2$ (FIG. 2D) defined along a direction of elongation of the lower body exoskeleton 108. In some embodiments, the second rotary assembly 140 is engaged with an upper end of the support member 142 by a joint 145 operable for increasing, decreasing, and/or maintaining a joint angle $\theta_2$ (FIG. 9C) of the lower body exoskeleton 108 relative to the vertical axis Y. In some embodiments, joint 145 includes an angle indicator 147 showing the angle $\theta_2$ held between the vertical axis Y and the direction of elongation of the lower body exoskeleton 108. As discussed, the upper body exoskeleton 106 and lower body exoskeleton 108 are configured to be positioned independently from one another. As shown, the lower body frame 104 further includes the abdominal support 109, the abdominal support 109 defining an abdominal support member 192 extending from the base portion 141 and an abdominal support pad 191 to support an abdomen of the patient.

In some embodiments, the support members 122 and 142 of the upper body and lower body frames 102 and 104 are each associated with a respective support member motor 214A and 214B (FIG. 11) or a pneumatic or hydraulic lifting mechanism (not shown) operable for extending or shortening the height of the support members 122 and 142 to lift or lower the upper body or lower body exoskeleton 106 or 108 relative to the ground. In some embodiments, the support member motors 214A and 214B are in operative communication with the controller 200 for lifting or lowering the exoskeleton 103 relative to the ground. In some embodiments shown in FIG. 9B, the first and second support members 122 and 142 may each define a respective outer support member 122A and 142A and a respective inner support member 122B and 142B arranged in a telescoping configuration such that the support members 122 and 142 are operable to be lengthened or shortened in a vertical direction Y. In some embodiments, the support members 122 and 142 can each include one or more height indicators 126 and 146 configured to display a height of the support member 122 or 142. Height indicators 126 and 146 can be inscribed on the support members 122 and 142 for manual adjustment or digitally displayed for motorized adjustment. To accommodate manual adjustment, one or more cranks (not shown), pneumatic or hydraulic releases (not shown), and/or locking mechanisms (not shown) are included with each respective support member 122 and 142 for extending or shortening the height of either support member 122 or 142. For motorized adjustment, controller 200 (FIG. 11) can control one or more motors 214A and 214B (FIG. 11) for extending or shortening the height of either support member 122 or 142.

Referring to FIGS. 3-7, the exoskeleton 103 is rotatably mounted on the support frame 101. As shown, the exoskeleton 103 defines the upper body exoskeleton 106 and the lower body exoskeleton 108, respectively configured to receive an upper body and a lower body of the patient. As shown, the upper body exoskeleton 106 extends laterally from the first rotary assembly 120 of the upper body frame 102 to receive an upper body of a patient. In some embodiments, the first rotary assembly 120 in association with the upper body exoskeleton 106 includes a plurality of lateral members 131 extending from the face 124 of the first rotary assembly 120 for supporting the upper body exoskeleton 106 and a housing 123 for encapsulation of motors, locking mechanisms, etc. associated with the first rotary assembly 120. The upper body exoskeleton 106 further includes an upper body harness 167 for receipt of the upper body of the patient, the upper body harness 167 being engaged with and supported by the plurality of lateral members 131. The upper body harness 167 may in some embodiments be engaged with the plurality of lateral members 131 by one or more engagement points 165. As indicated in FIGS. 1-7, the upper body harness 167 supports an upper back and rib cage of a patient, exposing the arms and midriff. In some embodiments, one or more pressure points can be identified where the body contacts the upper body harness 167.

Similarly, the lower body exoskeleton 108 extends laterally from the second rotary assembly 140 of the lower body frame 104 to receive a lower body of a patient. In some embodiments, the second rotary assembly 140 in association with the lower body exoskeleton 108 includes a plurality of lateral members 151 extending from the face 144 of the second rotary assembly 140. The lower body exoskeleton 108 further includes a lower body harness 177 for receiving the lower body of the patient, the lower body harness 177 being engaged with and supported by the plurality of lateral members 151. The lower body harness 177 may in some embodiments be engaged with the plurality of lateral members 151 by one or more engagement points 175. As indicated in FIGS. 3-7, the lower body harness 177 supports a pelvis and upper thighs of a patient, exposing the midriff and allowing a practitioner access to a lower back of the patient. In some embodiments, one or more pressure points can be identified where the body contacts the lower body harness 177.

In some embodiments, the exoskeleton 103 may include at least one of a headrest 171 (FIG. 3) and a facerest (not shown) for supporting a head of a patient while the patient is being supported by the surgical positioning system 100. In some embodiments, the headrest 171 and facerest (not shown) are integral to the upper body exoskeleton 106 and can in some embodiments be supported by the plurality of lateral members 131. In some embodiments, the headrest 171 is a cushion for supporting the back of the head, and the facerest (not shown) is a donut-shaped cushion or a grouping of cushions.

Figure 8A:
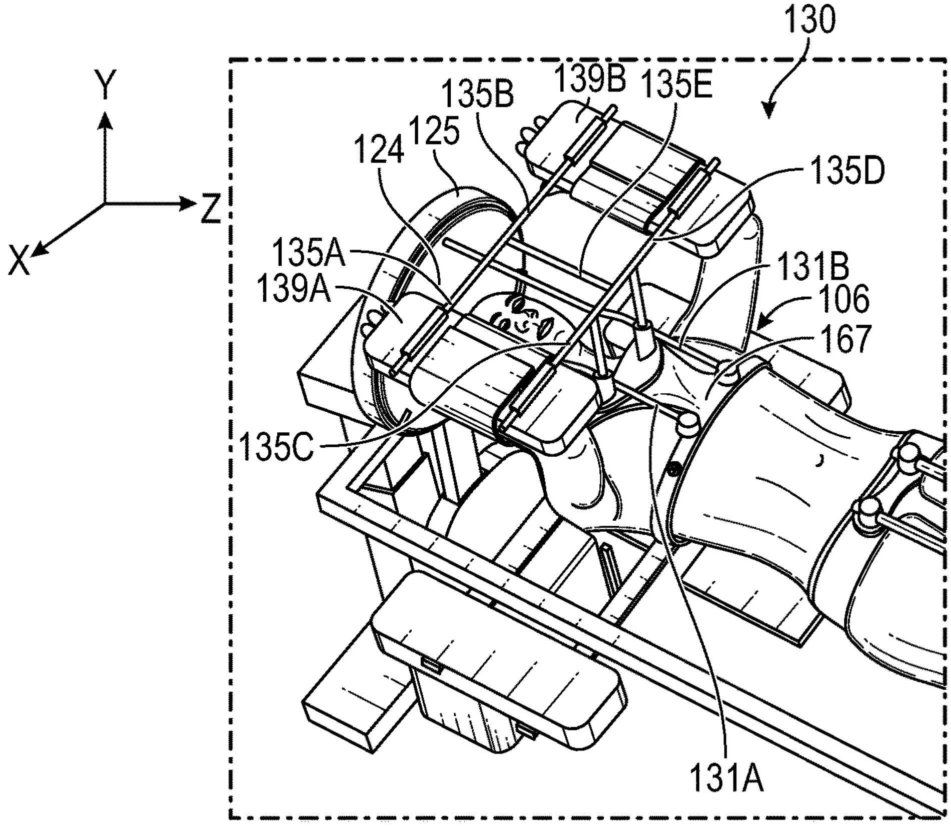
FIG. 8A is an illustration showing a perspective view of an armrest of the surgical positioning apparatus of FIG. 1.
Figure 8B:
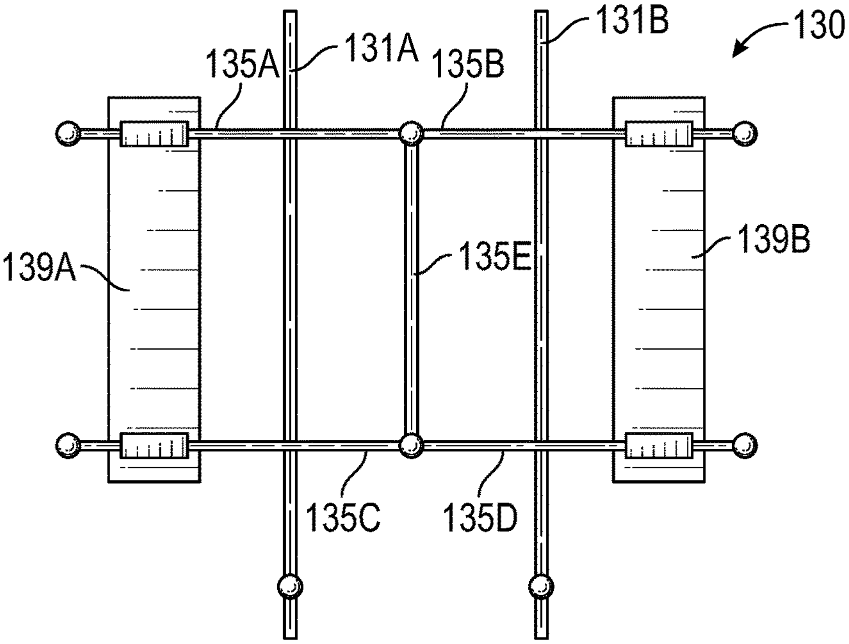
FIG. 8B is an illustration showing a top view of the armrest of FIG. 8A.
Figure 8C:
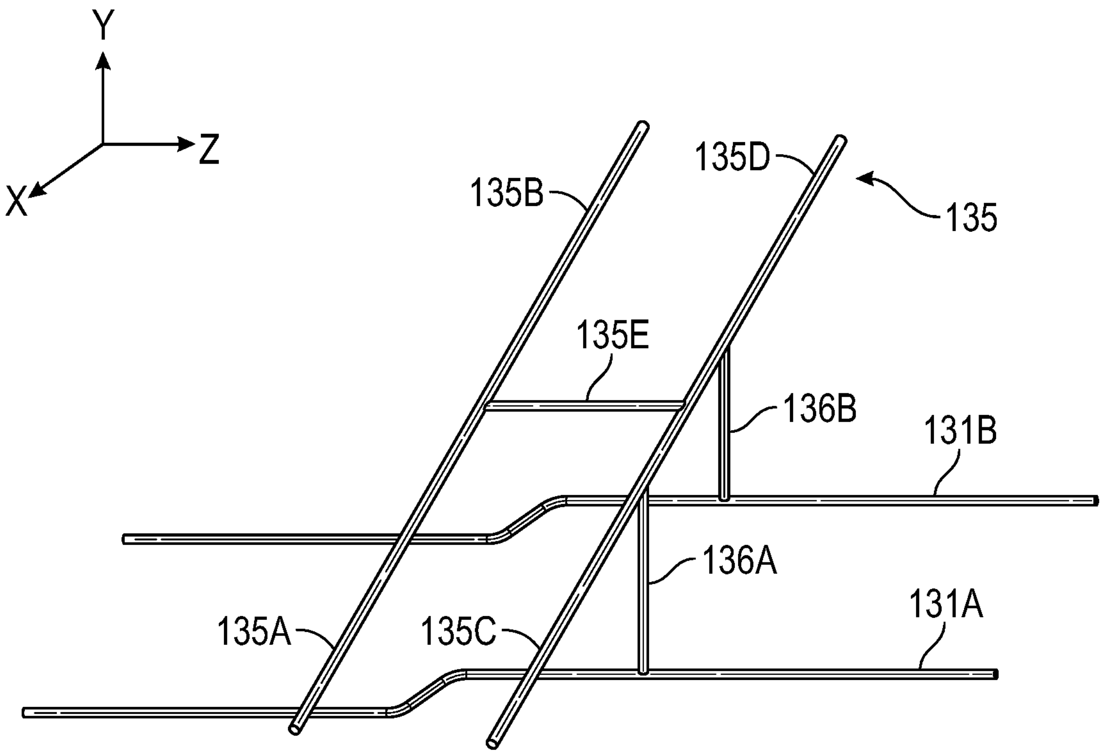
FIG. 8C is an illustration showing a perspective view of an armrest frame of the armrest of FIG. 8A.

Referring to FIGS. 1, 2A-2F, and 8A-8C, the surgical positioning apparatus 100 further includes an armrest portion 130 for support of the arms of a patient while the patient is positioned within the surgical positioning apparatus 100. As shown, in some embodiments the armrest portion 130 extends from first and second lateral members 131A and 131B (FIGS. 8A-8C) of the plurality of lateral members 131 associated with the upper body exoskeleton 106. The armrest portion 130 includes an armrest frame 135, a first cushion 139A engaged with the armrest frame 135 for supporting a right arm of a patient, and a second cushion 139B engaged with the armrest frame 135 for supporting a left arm of a patient. As shown in FIG. 8A, the first and second cushions 139A and 139B contact, support and restrain a respective right forearm and a left forearm of the patient. As shown specifically in FIG. 8C, in some embodiments the armrest frame 135 defines an "H" shaped frame. In particular, the armrest frame 135 defines a central member 135E oriented parallel to a direction of elongation of the first and second lateral members 131A and 131B. As shown, a first upper armrest member 135A and an opposite second upper armrest member 135B are defined at a distal end of the central member 135E and in perpendicular relation to the central member 135E. Similarly, as shown, a first lower armrest member 135C and an opposite second member 135D are defined at a proximal end of the central member 135E and in perpendicular relation to the central member 135E. Further, the armrest frame 135 is engaged to the first and second lateral members 131A and 131B by a respective first and second armrest support 136A and 136B. In particular, the first and second armrest supports 136A and 136B are respectively engaged with the first and second lower armrest members 135C and 135D and in some embodiments are operable to extend in length away from the patient to accommodate variations in arm length. In some embodiments, the first upper, first lower, second upper and second lower armrest members 135A, 135B, 135C and 135D are operable to be extended lateral to the patient to accommodate variations in shoulder width.

As discussed and as shown in FIGS. 2A-2F and 9A-9D, the exoskeleton 103 is mounted rotatably on the support frame 101 and is operable for rotation about a horizontal axis Z or about an axis $Q_{1,2}$ defined along a direction of elongation of the upper body exoskeleton 106 or the lower body exoskeleton 108 and locking into a plurality of individual angles $\phi_1$ (for upper body exoskeleton 106) and $\phi_2$ (for lower body exoskeleton 108). In some embodiments, the first rotary assembly 120 and second rotary assembly 140 are each operable to rotate the upper body exoskeleton 106 and lower body exoskeleton 108 to form respective rotational angles $\phi_1$ and $\phi_2$ and may each include a respective rotational motor 216A and 216B disposed within respective housings 123 and 143 for respectively rotating the upper body exoskeleton 106 and the lower body exoskeleton 108. In one aspect, the upper body exoskeleton 106 is operatively engaged or integral to the face 124 of the first rotary assembly 120. Similarly, the lower body exoskeleton 108 is operatively engaged or integral to the face 144 of the second rotary assembly 140. In some embodiments, the rotational motors 216A and 216B are in operative communication with the controller 200 (FIG. 11). In another embodiment, the upper body exoskeleton 106 and the lower body exoskeleton 108 may each include a respective handle (not shown) for manual rotation of the upper body exoskeleton 106 and the lower body exoskeleton 108 about axes $Q_{1,2}$ defined along a direction of elongation of the upper body exoskeleton 106 or lower body exoskeleton 108 and in a clockwise or counter-clockwise direction A or B to form respective rotational angles $\phi_1$ and $\phi_2$ (FIG. 9D).

Figure 9A:
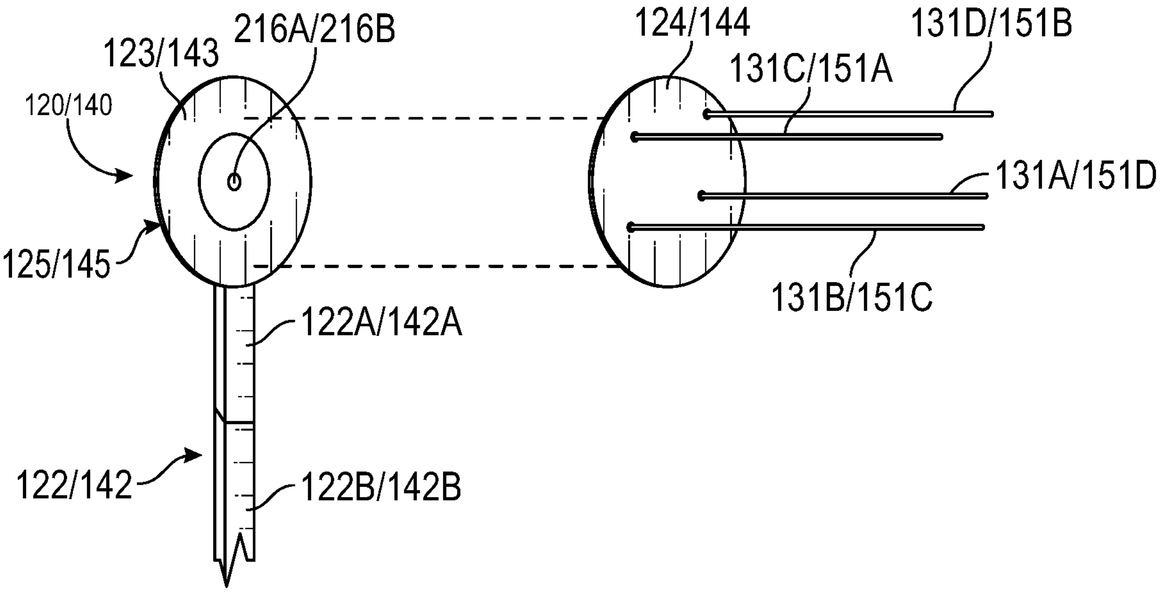
FIG. 9A is an illustration showing an exploded view of a frame portion of the surgical positioning apparatus of FIG. 1.
Figure 9B:
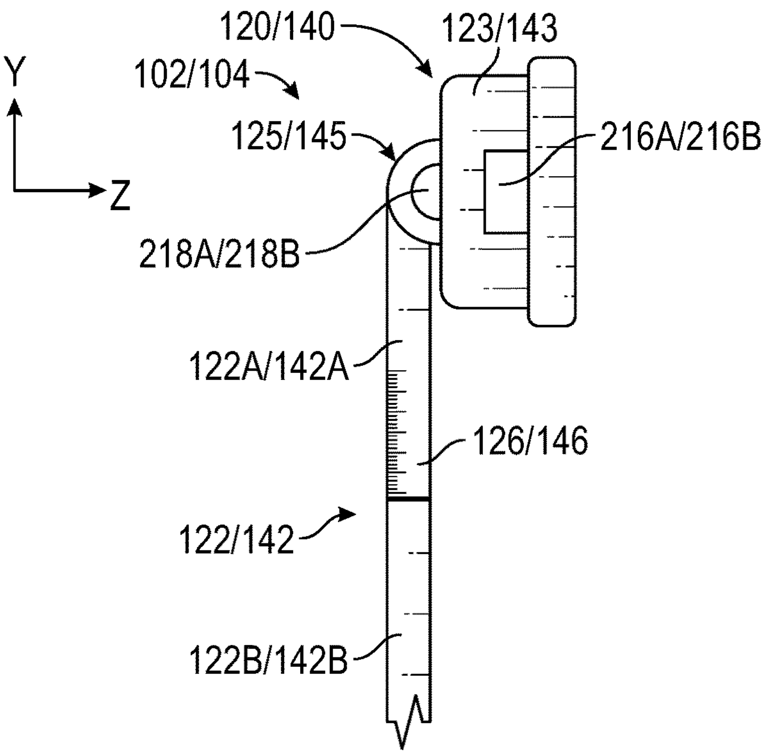
FIG. 9B is an illustration showing a side view of a frame portion of the surgical positioning apparatus of FIG. 1 including a height indicator.

Referring to FIG. 9B, the upper body exoskeleton 106 (FIG. 1) is associated with the upper body frame 102 of the support frame 101 by a joint 125 operable for increasing, decreasing, and/or maintaining joint angle $\theta_1$ (FIG. 9C) of the upper body exoskeleton 106 relative to the support member 122 of the upper body frame 102. In some embodiments, the joint 125 is actuated by a first joint motor 218A for increasing, decreasing, and/or maintaining the joint angle $\theta_1$ (FIG. 9C) of the upper body exoskeleton 106 relative to the support member 122 of the upper body frame 102. In some embodiments, the first joint motor 218A is in operative communication with the controller 200 (FIG. 11). In other embodiments, the joint 125 is manually actuated using a wheel or crank (not shown) or using pneumatics or hydraulics. In one aspect, the joint 125 includes a locking mechanism (not shown) such that joint angle $\theta_1$ (FIG. 9C) of the upper body exoskeleton 106 relative to the support member 122 of the upper body frame 102 is maintained.

Similarly, the lower body exoskeleton 108 (FIG. 1) is associated with the lower body frame 104 of the support frame 101 by the joint 145 operable for increasing, decreasing, and/or maintaining joint angle $\theta_2$ (FIG. 9C) of the lower body exoskeleton 108 relative to the support member 142 of the lower body frame 104. In some embodiments, the joint 145 is actuated by a second joint motor 218B for increasing, decreasing, and/or maintaining joint angle $\theta_2$ (FIG. 9C) of the lower body exoskeleton 108 relative to the support member 142 of the lower body frame 104. In some embodiments, the second joint motor 218B is in operative communication with the controller 200 (FIG. 11). In other embodiments, the joint 145 is actuated manually using a wheel or crank (not shown) or using pneumatics or hydraulics. In one aspect, the joint 145 includes a locking mechanism (not shown) such that an angle $\theta_2$ (FIG. 9C) of the lower body exoskeleton 108 relative to the support member 142 of the lower body frame 104 is maintained.

Figure 9C:
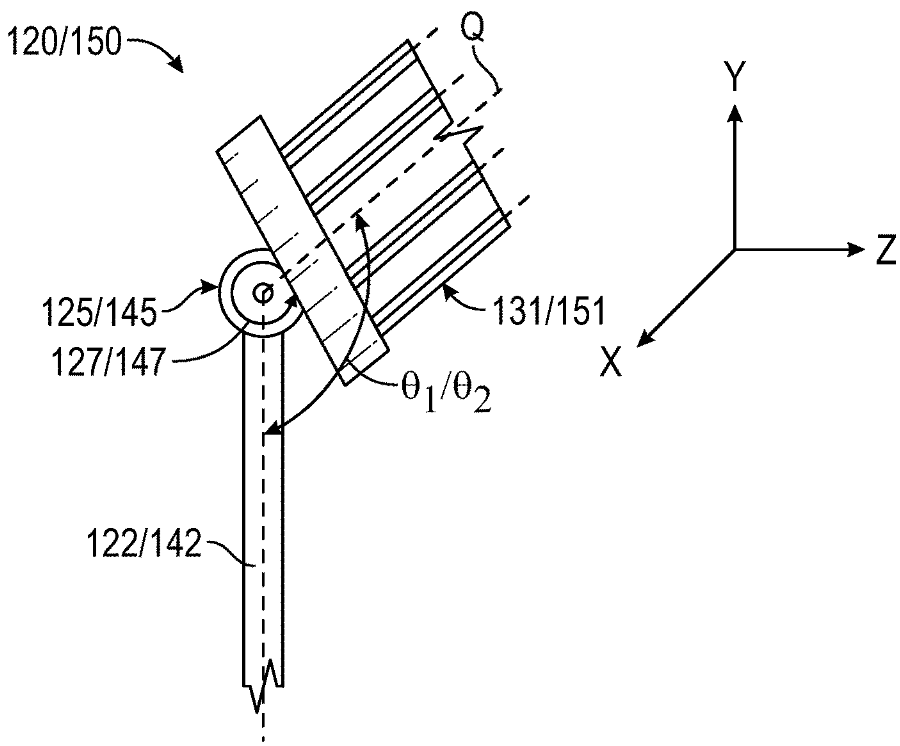
FIG. 9C is an illustration showing an angle and an angle indicator defined between a direction of elongation of the upper body exoskeleton and a support frame of the surgical positioning apparatus of FIG. 1.
Figure 9D:
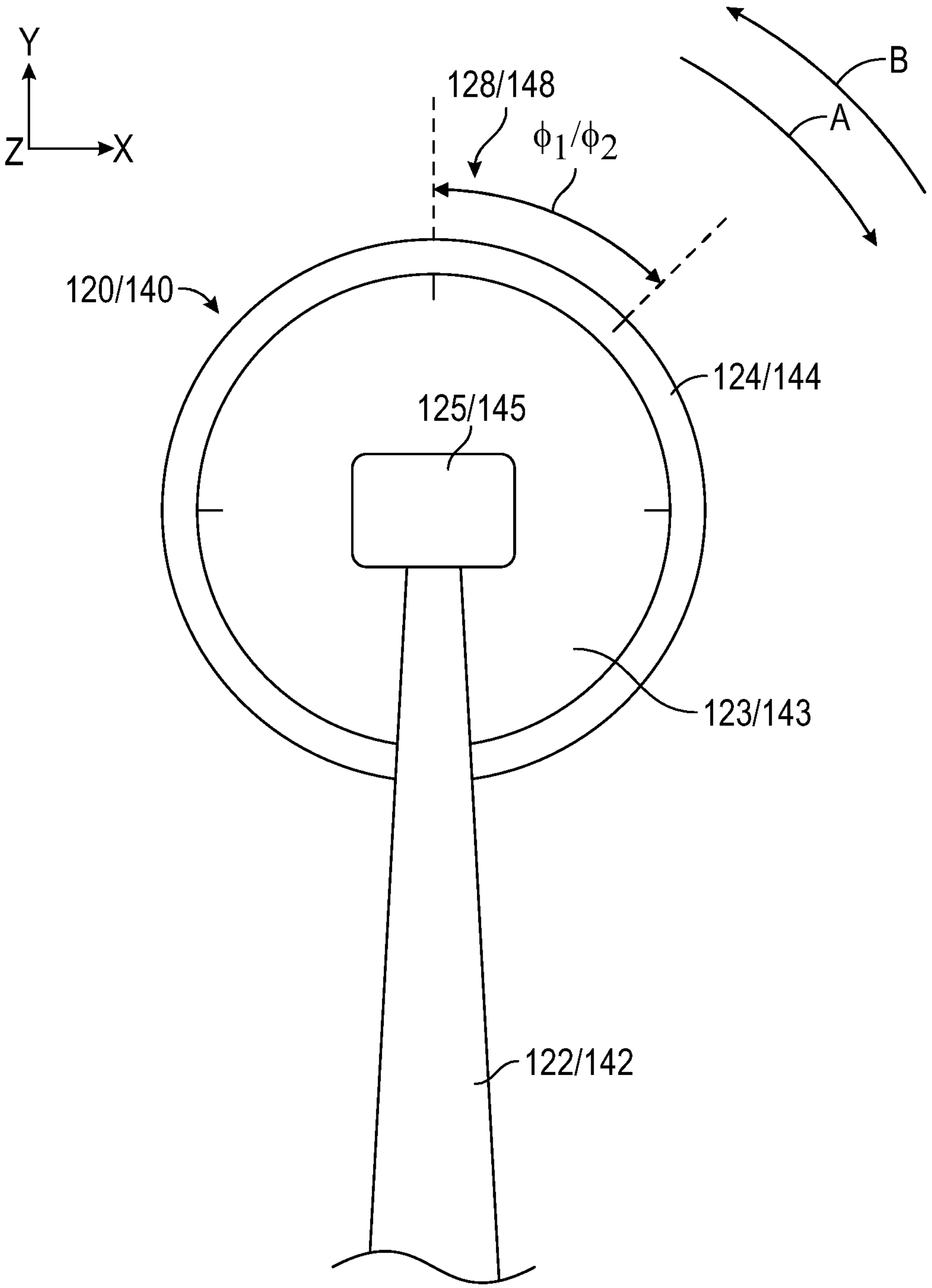
FIG. 9D is an illustration showing an angle indicator associated with a rotary assembly of the support frame.
Figure 10:
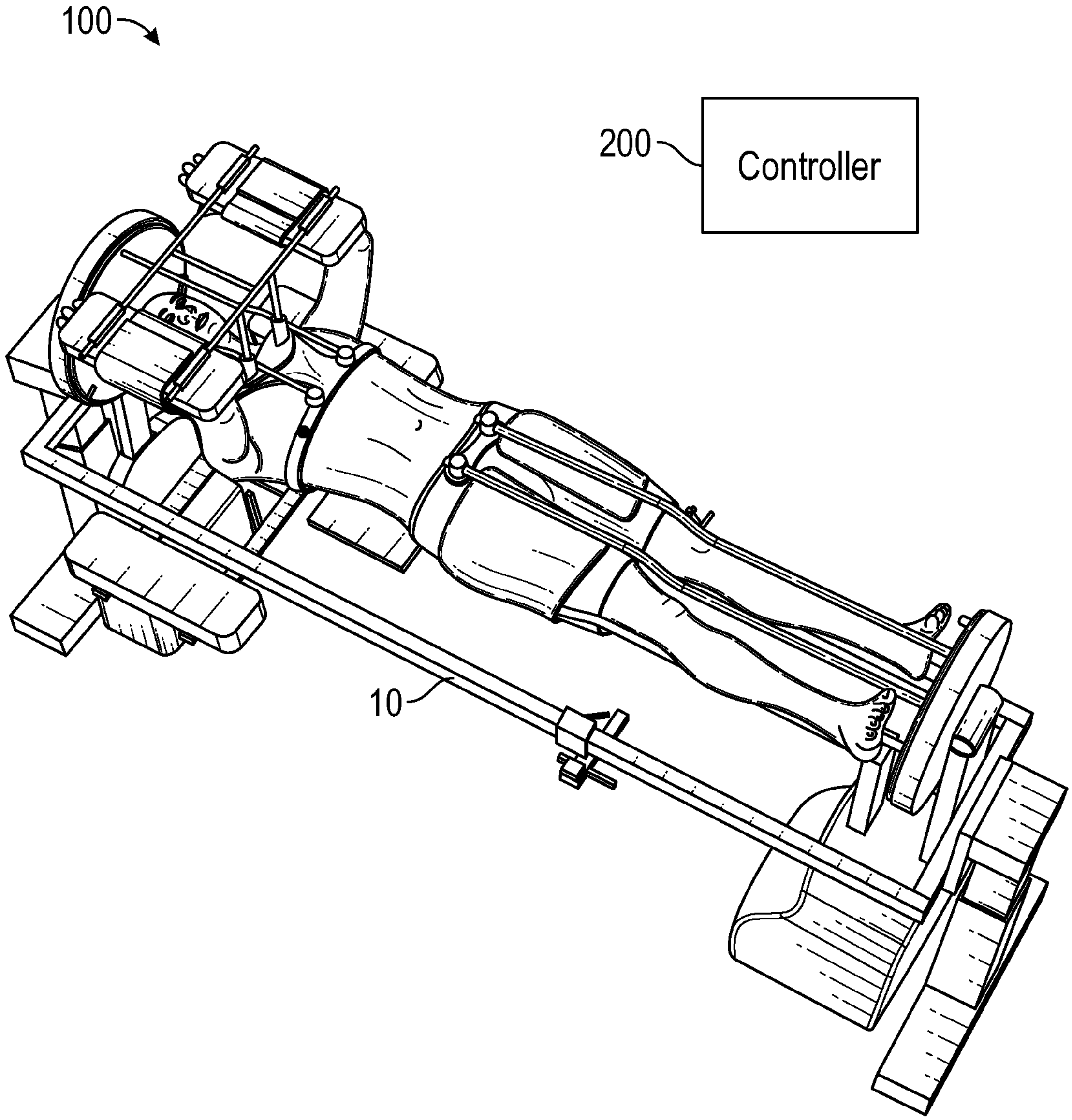
FIG. 10 is an illustration showing the surgical positioning apparatus of FIG. 1 in use with a conventional surgical table and a controller.

Referring to FIGS. 9B-9D, and as discussed above, in some embodiments the surgical positioning apparatus 100 includes a plurality of indicators to indicate position of various components of the surgical positioning apparatus 100. In particular, FIG. 9B illustrates the height indicator 126 and 146 associated with each respective upper body frame and lower body frame 102 and 104, and in some embodiments a height locking mechanism (not shown) associated with each to allow locking of the first and lower body frames 102 and 104 at a selected height. FIG. 9C illustrates joint indicator 127 and 147 associated with each respective joint 125 and 145, joint indicators 127 and 147 being respectively indicative of joint angles $\theta_1$ and $\theta_2$. In some embodiments, each joint 125 and 145 also include angle locking mechanisms (not shown) to allow locking of the selected angle. FIG. 9D illustrates a rotational indicator 128 and 148 for displaying rotational angles $\varphi_1$ and $\varphi_2$ of the upper body exoskeleton 106 and the lower body exoskeleton 108, as well as handles (not shown) and rotational locking mechanism (not shown) for manually selecting and locking rotational angles $\varphi_1$ and $\varphi_2$.

As discussed above and shown in FIGS. 10-11, in some embodiments the surgical positioning apparatus 100 may be motorized and controllable by the controller 200. The controller 200 may include a processor in communication with an input device. As discussed above, the controller 200 is in electrical communication with the abdominal support motor 212 for lifting and lowering the abdominal support 109 relative to the ground. In some embodiments, the controller 200 is in electrical communication with the first and second support motors 214A and 214B for extending or shortening the first and second support members 122 and 142 (FIG. 9B) such that the upper and lower body exoskeletons 106 and 108 (FIG. 1) are lifted or lowered relative to the ground. As shown, the controller 200 is also in electrical communication with the first and second rotational motors 216A and 216B for rotating the upper body exoskeleton 106 and the lower body exoskeleton 108 in a first or second rotational direction A or B about the axis $Q_{1,2}$ (FIG. 2D) defined along a direction of elongation of the upper body exoskeleton 106 or the lower body exoskeleton 108 to form rotational angles $\varphi_1$, $\varphi_2$ of the upper body exoskeleton 106 and the lower body exoskeleton 108. The controller 200 is in electrical communication with the first and second joint motors 218A and 218B for increasing or decreasing an angle $\theta_{1,2}$ (FIG. 9C) of the upper body exoskeleton 106 and the lower body exoskeleton 108 relative to the support frame 101. In some embodiments, the controller 200 may be operable for storing one or more preset positions or transition protocols corresponding with various surgical positions such as prone, lateral, lateral oblique, kidney, supine and jackknife, as well as elevation of one end of the body relative to the other or any intermediate position, allowing versatility in body types, positions and procedures.

In some embodiments, the controller 200 may take as input a value indicative of at least one of a patient height, weight, or other measurements indicative of a size or condition of the patient. In some embodiments, the surgical positioning apparatus 100 includes a plurality of sensors (not shown) to measure heights, joint angles $\theta_1$ and $\theta_2$, and rotational angles $\varphi_1$ and $\varphi_2$ associated with both the upper body frame 102 and the lower body frame 104 and provide feedback to the controller 200. Due to its maneuverability and versatility, the surgical positioning apparatus 100 and controller 200 can be integrated with surgical planning software or a robotic-assisted surgery platform to provide more precise positioning and planning of the patient to best reach target structures. In some embodiments, the sensors (not shown) can be used for stereotactic purposes and/or to identify bodily landmarks relative to the surgical positioning apparatus 100 to provide relativity to the practitioner in locating and accessing particular target structures. In some embodiments of the surgical positioning apparatus 100, the upper body harness 167 and lower body harness 177 further include one or more "bladder" inserts strategically placed at various pressure points to relieve pressure between the exoskeleton 103 and the patient, thus reducing discomfort and lowering a probability of developing pressure sores. Further, in some embodiments, the upper body harness 167 and lower body harness 177 include one or more lead (Pb) inserts to reduce exposure of various vital organs to accumulated radiation.

Referring to FIGS. 2A-2F, in one method of positioning a patient using the exoskeleton positioning system 100, for rotation of a patient from the prone position or supine position to the lateral position or vice versa, the exoskeleton 103 is lifted relative to the ground and/or the abdominal support 109 is lowered relative to the patient and the exoskeleton 103 is rotated 90 degrees ($\varphi_{1,2}$=90) (less than or more than 90 degrees if transitioning to lateral oblique) about the horizontal axis Z or axis $Q_{1,2}$ (FIG. 2D) defined along a direction of elongation of the upper body exoskeleton 106 or lower body exoskeleton 108 in a clockwise or counterclockwise direction A or B. The exoskeleton 103 is then lowered relative to the ground and/or the abdominal support 109 is raised relative to the patient. To transition a patient from the lateral position to the kidney position or from the prone position to the jackknife position, the first joint 125 (FIG. 9B) and the second joint 145 (FIG. 9B) are actuated such that an angle $\theta_1$ of a direction of elongation of the upper body exoskeleton 106 is increased relative to the horizontal axis Z and an angle $\theta_2$ of a direction of elongation of the lower body exoskeleton 108 is increased relative to the support frame 101. The abdominal support 109 is raised to support an elevated abdomen of the patient. To transition a patient from kidney position back to the lateral position or from jackknife position back to the prone position, the first joint 125 (FIG. 9B) and the second joint 145 (FIG. 9B) are actuated such that an angle $\theta_1$ of the upper body exoskeleton 106 is decreased relative to the support frame 101 and an angle $\theta_2$ of the lower body exoskeleton 108 is decreased relative to the support frame 101. The abdominal support 109 is lowered to support a lowered abdomen of the patient. In some embodiments, the patient can be transitioned from prone to supine position or from supine to prone position by lifting the exoskeleton 103 relative to the ground and/or lowering the abdominal support 109 relative to the patient and the exoskeleton 103 is rotated 180 degrees about the horizontal axis Z in a clockwise or counterclockwise direction A or B. The exoskeleton 103 is then lowered relative to the ground and/or the abdominal support 109 is raised relative to the patient to support the abdomen of the patient.

Figure 12:
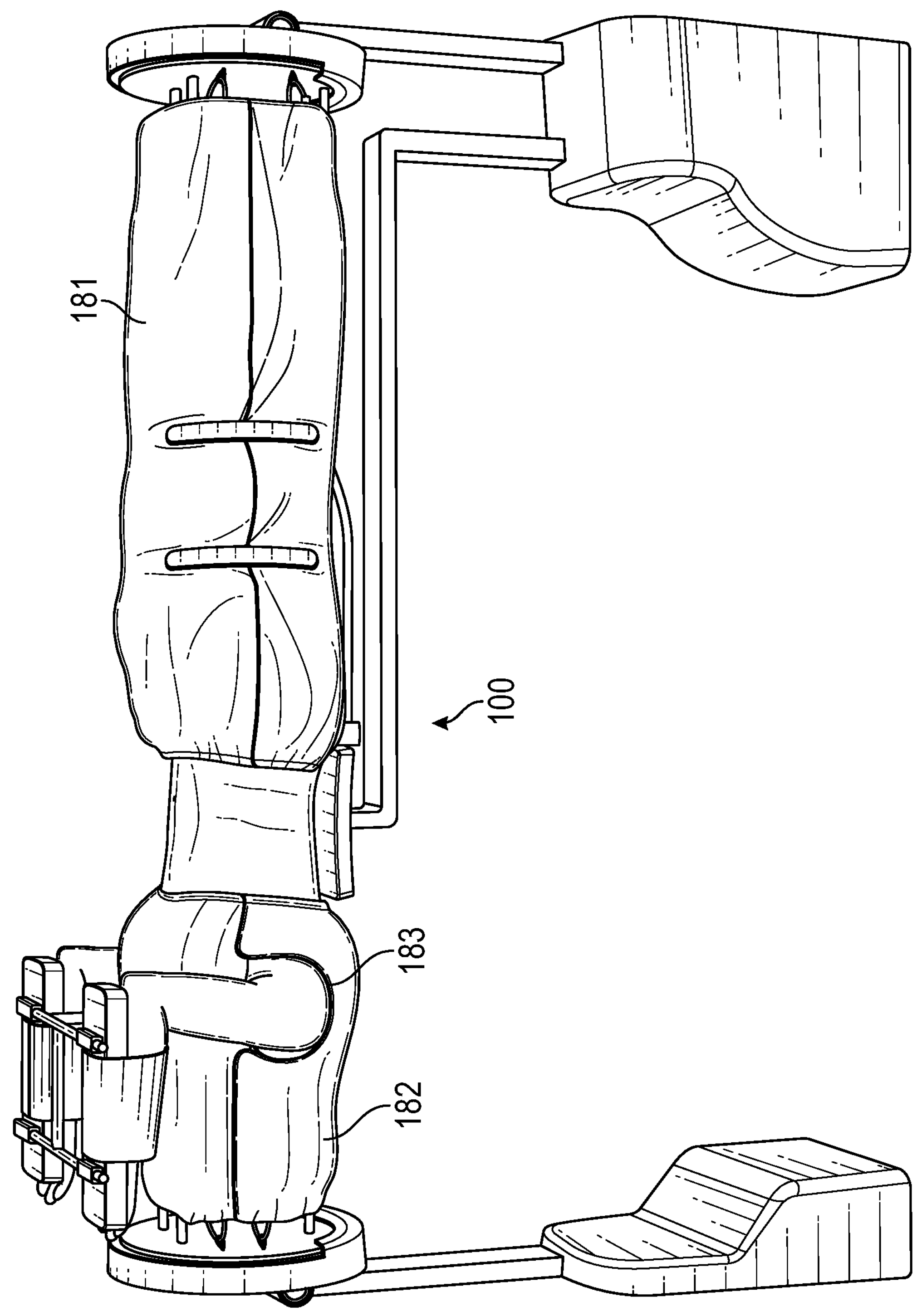
FIG. 12 is an illustration showing the surgical positioning apparatus of FIG. 1 in use with sterile drapes.

In some embodiments, the upper body harness 167 and the lower body harness 177 may be removable from the surgical positioning apparatus 100 and may come in a plurality of sizes to accommodate patients of variable size and gender. In one aspect, the upper body harness 167 and the lower body harness 177 include one or more straps for adjustability, and may in some embodiments include one or more lead inserts for protection of vital organs from accumulated radiation exposure. In some embodiments, a plurality of bladders may be positioned between the patient and the exoskeleton 103 for added comfort and support while the patient is positioned within the surgical positioning apparatus 100. As shown in FIG. 12, sterile drapes 181 and 182 can be wrapped around the upper body and the lower body of the patient to just expose the abdomen around the lower thoracic and lumbar spine. Upper body drape 182 covers the upper body and the upper body exoskeleton 106, and in some embodiments exposes the midriff including the lower thoracic spine. Upper body drape 182 can further include arm holes 183 that expose the arms of the patient and allowing repositioning of the arms by armrest 130. Lower body drapes 181 similarly cover the lower body and the lower body exoskeleton 108, and in some embodiments expose the lumbar spine. In some embodiments, upper and lower body drapes 182 and 181 can include radiologically protective materials such as lead (Pb). In a particular embodiment, the drapes 181 and 182 can each be made to wrap around the body of the patient and be secured with ties, hook-and-loop fasteners, or other reusable fastening means.

In some embodiments, the surgical positioning apparatus 100 can be used as a basis for stereotaxy. In particular, the surgical positioning apparatus 100 can be utilized to locate various points in the body by providing measurable relativity of location to one or more identifiable points in the body. Using the surgical positioning apparatus 100, a practitioner can identify locations of pressure points where the body contacts the frame, move a patient to a desired position and can plan procedures based on location, angle, and/or position of various body parts relative to the position of the body, pressure points, and the surgical positioning apparatus 100.

The present surgical positioning apparatus 100 allows a practitioner to precisely articulate the body into various positions by allowing separable articulation of the upper body and the lower body relative to one another. In particular, the surgical positioning apparatus 100 allows individual adjustment (i.e. rotation about a longitudinal axis, angle relative to horizontal, and positioning) of the upper body associated with the upper body frame 106 or the lower body associated with the lower body frame 108 relative to one another, as shown in FIG. 7, allowing for customizable positioning and access to various target structures. This can prove particularly useful during surgical planning by allowing a practitioner to precisely position a patient in a manner that allows for improved access to a target structure, or by allowing a practitioner to work around a deformity or injury to access a target structure.

In some embodiments, the surgical positioning apparatus 100 can be used for precision surgical planning. In particular, the surgical positioning apparatus 100 can be used to identify reference points on the body, such as one or more pressure points where the body contacts the surgical positioning apparatus 100, allowing a practitioner to understand where in space the body is for improved navigation of target structures. Using the surgical positioning apparatus 100, the patient can be positioned in a particular way according to the particular surgery that is needed. For example, accessing a target structure during a lam inectomy is achieved by positioning the patient according to FIG. 7 such that an "arch" is created at the target structure and a practitioner can access the space. To create this "arch" at different locations along the spine, joint angles $\theta_1$ and $\theta_2$ can be manipulated relative to each other to move the "arch" up closer to the neck or down closer to the tailbone.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A surgical positioning system, comprising: an exoskeleton rotatably mounted on a support frame, the exoskeleton collectively defining: an upper body exoskeleton; and a lower body exoskeleton; wherein the upper body exoskeleton and the lower body exoskeleton are configured for being positioned independently of one another; and the support frame in operative association with the exoskeleton, the support frame comprising: an upper body frame including a first support member extending upward to align with a vertical axis; further including a first rotary assembly including a first face; pivotably coupled to the upper body exoskeleton, wherein the upper body exoskeleton is rotatably mounted to the upper body frame; and a lower body frame including a second support member extending upward in a vertical direction; further including a second rotary assembly including a second face; pivotably coupled to the lower body exoskeleton, wherein the lower body exoskeleton is rotatably mounted on the second support frame an abdominal support directly connected to the lower body frame, the abdominal support operable for being raised or lowered relative to the exoskeleton and wherein the abdominal support is configured for supporting an abdominal area of a patient.

2. The surgical positioning system of claim 1, wherein the upper body exoskeleton is configured to receive an upper body of a patient and wherein the lower body exoskeleton is configured to receive a lower body of the patient.

3. The surgical positioning system of claim 1, wherein the upper body exoskeleton further comprises:

a first plurality of lateral support members extending from the upper body frame, wherein each lateral support member of the first plurality of lateral support members is engaged to an upper body harness.

4. The surgical positioning system of claim 1, wherein the lower body exoskeleton further comprises:

a second plurality of lateral support members extending from the lower body frame, wherein each lateral support member of the second plurality of lateral support members is engaged to a lower body harness.

5. The surgical positioning system of claim 1, wherein the upper body frame and the lower body frame are operable for lifting and lowering the exoskeleton in a vertical direction Y.

6. The surgical positioning system of claim 1, wherein the exoskeleton is operable to expose a midriff of the patient, a lower thoracic spine of the patient, and a lumbar spine of the patient.

7. The surgical positioning system of claim 1, wherein the upper body frame comprises a first joint that pivotably couples the upper body frame to the upper body exoskeleton such that an angle $\theta_1$ defined between a horizontal axis Z and a direction of elongation of the upper body frame is increased or decreased.

8. The surgical positioning system of claim 1, wherein the lower body frame comprises a second joint pivotably coupling the lower body frame to the lower body exoskeleton such that an angle $\theta_2$ defined between a horizontal axis Z and a direction of elongation of the lower body frame is increased or decreased.

9. The surgical positioning system of claim 1, wherein the upper body frame is associated with an armrest portion, the armrest portion comprising:

an armrest frame in association with a first plurality of lateral support members extending from the upper body frame, wherein the armrest frame is configured to restrain a right forearm and a left forearm of the patient.

10. The surgical positioning system of claim 1, further comprising:

one or more height indicators associated with a support member of the upper body frame; and one or more height indicators associated with a support member of the lower body frame;

wherein the one or more height indicators being configured to display a height of the upper body frame and the lower body frame.

11. The surgical positioning system of claim 1, further comprising:

one or more joint angle indicators associated with a first joint of the upper body frame, the one or more joint angle indicators of the upper body frame being configured to display an angle $\theta_1$ defined between a horizontal axis Z and a direction of elongation of the upper body exoskeleton; and one or more joint angle indicators associated with a second joint of the lower body frame, the one or more joint angle indicators of the lower body frame being configured to display an angle $\theta_2$ defined between the horizontal axis Z and a direction of elongation of the lower body exoskeleton.

12. The surgical positioning system of claim 1, further comprising:

one or more rotational angle indicators associated with a first rotary assembly of the upper body frame, the one or more rotational angle indicators associated with the first rotary assembly being configured to display an angle $\phi_1$ defined as an angle of rotation of the upper body exoskeleton relative to a vertical axis Y about an axis $Q_1$ defined along a direction of elongation of the upper body exoskeleton; and one or more rotational angle indicators associated with a second rotary assembly of the lower body frame, the one or more rotational angle indicators associated with the second rotary assembly being configured to display an angle $\phi_2$ defined as an angle of rotation of the lower body exoskeleton relative to a vertical axis Y about an axis $Q_2$ defined along a direction of elongation of the lower body exoskeleton.

13. The surgical positioning system of claim 1, further comprising:

an upper body drape associated with the upper body exoskeleton and configured to be wrapped around an upper body of a patient; and a lower body drape associated with the lower body exoskeleton and configured to be wrapped around a lower body of a patient.

14. A method for repositioning a surgical positioning system, the method comprising: providing a surgical positioning system including an exoskeleton rotatably mounted on a support frame, the exoskeleton collectively defining an upper body exoskeleton and a lower body exoskeleton, wherein the support frame includes an upper body frame pivotably including a first support member extending upward to align with a vertical axis; further including a first rotary assembly including a first face; coupled to the upper body exoskeleton by a first joint, and a lower body frame including a second support member extending upward in a vertical direction; further including a second rotary assembly including a second face; pivotably coupled to the lower body exoskeleton by a second joint, wherein the upper body exoskeleton is rotatably mounted to the first rotary assembly, wherein the lower body exoskeleton is rotatably mounted on the second rotary assembly, and wherein the surgical exoskeleton includes an abdominal support member directly connected to the lower body frame configured for being lifted or lowered in a vertical direction; lifting the upper body exoskeleton and the lower body exoskeleton relative to the abdominal support member; rotating the upper body exoskeleton and the lower body exoskeleton in a first rotational direction or an opposite second rotational direction about a horizontal axis by the first rotary assembly and the second rotary assembly; increasing or decreasing an angle of the upper body exoskeleton relative to the upper body frame by the first joint; and increasing or decreasing an angle of the lower body exoskeleton relative to the lower body frame by the second joint.

15. The method of claim 14, further comprising:

orienting the surgical positioning system from a prone position or a supine position into a lateral position by:

lifting the exoskeleton in the vertical direction;

rotating the exoskeleton 90 degrees in a clockwise or counterclockwise direction about the horizontal axis or an axis defined along a direction of elongation of the exoskeleton; and lowering the exoskeleton in the vertical direction.

16. The method of claim 14, further comprising:

orienting the surgical positioning system from a lateral position or a prone position into a jackknife position or a kidney position by:

actuating the first joint such that an angle of the upper body exoskeleton is increased relative to the horizontal axis; and actuating the second joint such that an angle of the lower body exoskeleton is increased relative to the horizontal axis.

17. The method of claim 14, further comprising:

orienting the surgical positioning system from a kidney position or a jackknife position into a prone position or a kidney position by:

actuating the first joint such that an angle of the upper body exoskeleton is decreased relative to the horizontal axis; and actuating the second joint such that an angle of the lower body exoskeleton is decreased relative to the horizontal axis.

18. The method of claim 14, further comprising:

orienting the surgical positioning system from a prone position or a supine position into a supine position or a prone position by:

lifting the exoskeleton in the vertical direction;

rotating the exoskeleton 180 degrees in a clockwise or counterclockwise direction about the horizontal axis or an axis defined along a direction of elongation of the exoskeleton; and lowering the exoskeleton in the vertical direction.

19. The method of claim 14, further comprising:

lifting or lowering the abdominal support member relative to the exoskeleton.

* * * * *